358-74 SR
11/24/87 OR 4,709,262

United States Patent [19]

Spieth et al.

[11] Patent Number: 4,709,262

[45] Date of Patent: Nov. 24, 1987

[54] COLOR MONITOR WITH IMPROVED COLOR ACCURACY AND CURRENT SENSOR

[75] Inventors: Robert H. Spieth, Ronkonkoma; Anthony N. DeLorenzo, Ft. Salonga, both of N.Y.

[73] Assignee: Hazeltine Corporation, Greenlawn, N.Y.

[21] Appl. No.: 7,316

[22] Filed: Jan. 27, 1987

Related U.S. Application Data

[63] Continuation of Ser. No. 722,959, Apr. 12, 1985, abandoned.

[51] Int. Cl.[4] ......................... H04N 9/73; H04N 5/68

[52] U.S. Cl. ......................................... 358/74; 358/27; 358/243

[58] Field of Search ........................ 358/27, 65, 74, 29, 358/243, 168

[56] References Cited

U.S. PATENT DOCUMENTS

| | | | |
|---|---|---|---|
| 4,067,048 | 1/1978 | Norman | 358/243 |
| 4,204,808 | 6/1980 | Harwood | 358/74 |
| 4,237,489 | 12/1980 | Kresock | 358/168 |
| 4,295,166 | 10/1981 | Shanley, II et al. | 358/243 |
| 4,361,850 | 11/1982 | Nishimura | 358/65 |
| 4,370,674 | 1/1983 | Johnson et al. | 358/74 |
| 4,404,593 | 9/1983 | Shanley, II et al. | 358/168 |
| 4,516,152 | 5/1985 | Willis | 358/74 |
| 4,554,578 | 11/1985 | Willis | 358/74 |
| 4,554,588 | 11/1985 | Shanley, II | 358/74 |
| 4,599,642 | 7/1986 | Willis | 358/29 |

*Primary Examiner*—James J. Groody
*Assistant Examiner*—Robert M. Bauer
*Attorney, Agent, or Firm*—E. A. Onders; F. R. Agovino

[57] ABSTRACT

A color monitor having a highly accurate video processing circuit for providing a high accuracy color CRT display is disclosed which utilizes three feedback loops in each of the three primary color channels, each feedback loop including both the final video amplifier and the CRT in order to achieve equalization and stabilization of their combined signal-to-brightness transfer characteristics against both CRT and circuit drift. The video processor circuitry also includes a D/A converter for generating a signal representative of the desired amplitude component for each primary color from a three bit digital input. By utilizing the three feedback loops, the color produced in the CRT display is independent of the operator set brightness and contrast settings and is maintained to within 10% of its desired value over varying temperature and adverse environmental conditions.

19 Claims, 6 Drawing Figures

COLOR MONITOR WITH IMPROVED COLOR ACCURACY AND CURRENT SENSOR

This application is a continuation of application Ser. No. 06/722,959, filed Apr. 12, 1985, now abandoned.

BACKGROUND OF THE INVENTION

The present invention relates generally to high resolution and high chromaticity color monitors and televisions. More particularly, the present invention relates to a novel system for providing accurate color reproduction for color monitors and televisions.

In many military and industrial raster-scanned monitor applications, it has been found to be beneficial to display the monitored information on a video screen as color-coded graphics and alphanumeric data. While there are definite advantages to displaying color-coded data in military command and industrial control situations, such advantages could not heretofore be realized because, owing to the amount of data to be displayed on the screen, color monitor displays were not capable of sufficient resolution, color accuracy and color purity.

In fact, heretofore, monochrome video monitors actually outperformed conventional color displays in such areas as sharpness and legibility of data over the entire display surface; color control and reproducibility; adaptability to the human operator; immunity to shock and vibration; and performance stability over time.

In order to provide for the effective display of multicolored data and graphics on a color monitor, the monitor must produce very high true visual display resolution and accurately reproducible colors. The colors produced must be free of visible jitter, drift and misconvergence, on the entire display surface of the monitor screen, including the edges and corners. In such manner, the display parameters are controlled to optimize the ability of the operator to read the color-coded display data. In the past, to achieve such accuracy of display parameters required frequent maintenance, sometimes under adverse environmental operating conditions.

The achievement of such characteristics provides high legibility and accurate reading of high density display data typically found in military command and control applications. In such applications, as well as various other industrial and transportation control enterprises, characters, complex symbols and other details must be small to minimize the overlapping and unreadability of the data. The display quality of monitors built to achieve the above characteristics equals or surpasses that of the best monochrome monitors of comparable size, while providing the additional benefits of color-coding.

Military command and control systems are increasingly required to cope with dense target environments requiring rapid processing, display and decision-making on large amounts of data. The display system must present the data to the operator in a form which enables him to quickly and accurately identify and track items of interest amid the clutter and overlapping of many or similar-appearing items. Further, such items are constantly changing positions, with the frequent, random appearance of new items, usually near the edges of the display.

Color-coding of the display data can improve operator accuracy, shorten his reaction time and lessen his fatigue, by serving as a highlighter and an aid to discrimination of similar-appearing data in a dense display. Such benefits have encouraged increased use of color displays, both in military applications, and also civilian activities, such as air traffic control systems.

Prior to the present invention, several parameters of color display performance have been less satisfactory than those of monochrome displays for such usage. The present invention has resulted in significant improvements that are necessary in order to achieve any benefit from the addition of color-coding. Such improvements are in the areas of legibility, that is, the crispness and readability of the data; chromaticity, that is, color control for optimum human perception and readability; and color convergence, that is, the coincidence of position of primary colors and performance stability over time. The color monitor described generally, and the color correction circuit specifically described herein, achieve such performance goals.

The color reproducibility circuitry of the present invention is designed to provide a highly legible display, as well as to accurately display selected colors controlled to close tolerances, for example, within 10%, over varying temperature and adverse environmental conditions. Such color reproducibility is achieved regardless of operator settings of the brightness and contrast controls.

SUMMARY AND OBJECTS OF THE INVENTION

In view of the foregoing, it should be apparent that there still exists a need in the art for a color monitor having a highly accurate video processor circuit such that the display exhibits a high degree of legibility, color resolution and color accuracy. It is, therefore, a primary object of this invention to provide a color monitor having a video processor circuit resulting in a display which exhibits a high degree of legibility, color resolution and color accuracy and which has particular application in military command and control environments, as well as in civilian environments.

More particularly, it is an object of the present invention to provide a color monitor having video processor circuitry capable of providing a highly accurate and precise color function such that the color accuracy is controlled to a tolerance of approximately 10%.

It is another object of the present invention to provide a color monitor having a video processor circuit constructed of digital and analog circuit components such that it can operate accurately under adverse environmental conditions.

Yet another object of the present invention is to provide a color monitor having a video processor circuit which utilitzes a 3 bit color code to provide up to eight different colors, including black, on its display.

Still another object of the present invention is to provide a color monitor having a video processor circuit which utilizes digital-to-analog conversion of a three bit input digital code to set the RGB amplitude components of each data color to the required center value.

It is a further object of the present invention to provide a color monitor which uses a video processor circuit having three feedback loops which maintain the brightness of each primary color to within 10% of the desired value over the full range of operating environments.

Another object of the present invention is to provide a color monitor having a video processor circuit having three feedback loops in each of the three primary color channels which include both the final video amplifier and the CRT in order to achieve equalization, or color tracking, and stabilization of their combined signal-to-brightness transfer characteristics against CRT and circuit drift.

It is another object of the present invention to provide a color monitor having a video processor circuit in which the color produced is independent of the operator set brightness and contrast settings by using color tracking and non-additive mixing of raster background color and data colors..

Briefly described, these and other objects of the present invention are accomplished by providing a color monitor having a video processor circuit which utilizes three feedback loops associated with and not affecting each of the three primary color channels. Each of the feedback loops include both the final video amplifier and the CRT in order to achieve equalization and stabilization of their combined signal-to-brightness transfer characteristics against both CRT and circuit drift. The video processor circuitry includes an analog-to-digital converter for conversion of the three bit digital code to an analog signal representing the amplitude component of each of the RGB colors. Each video processor channel circuitry also includes a video preamplifier and amplifier, as well as three feedback loops, one each for establishing the white and black sample levels and one for providing for CRT cathode stabilization by setting blanking bias levels using a sample of the CRT cathode current.

DETAILED DESCRIPTION OF THE PREFERRED EMBODIMENT

Figure 1:
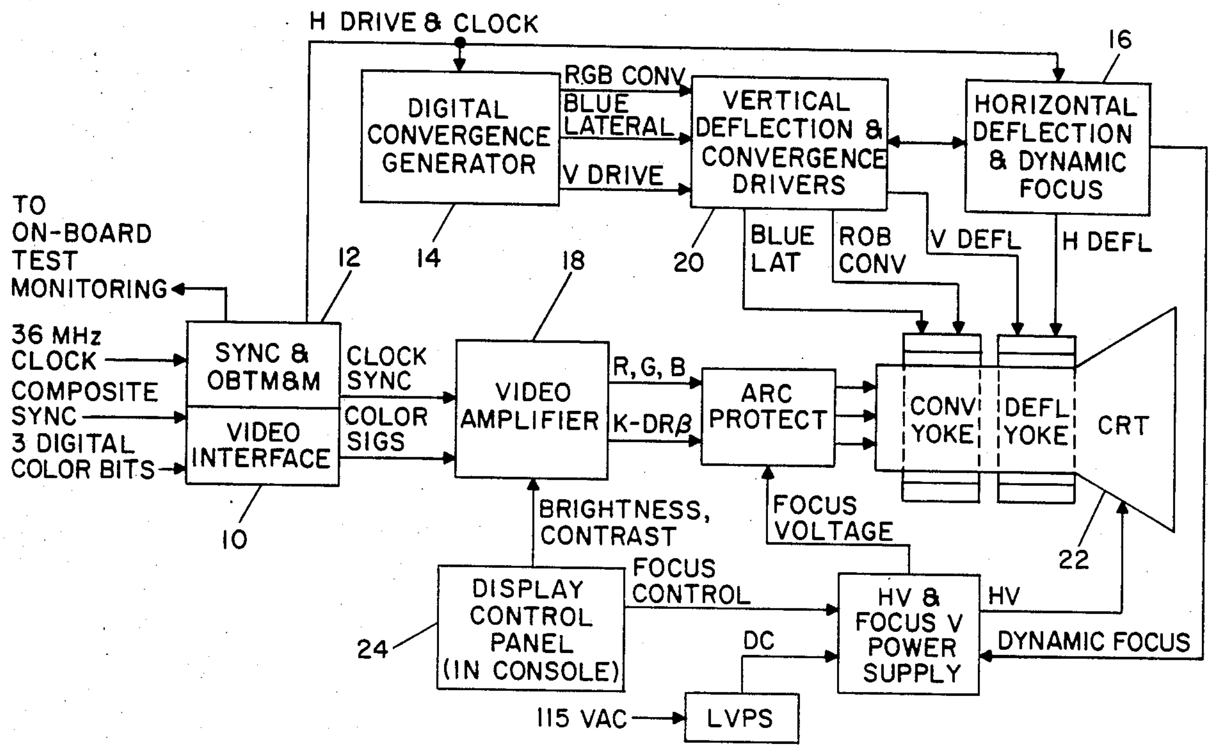
FIG. 1 is a block diagram of the circuitry of the color monitor of the present invention.

At the outset, it should be pointed out that circuits which perform the functions indicated in the blocks of FIG. 1 are known to those of ordinary skill in the art, and others, for use in color monitors. Thus, only certain portions of that circuitry have been described in detail herein, so as not to unnecessarily obscure the present invention.

Referring now to the various drawing figures, in which like elements are indicated by like reference numerals throughout, there is shown in FIG. 1, in schematic block diagram form, the color monitor of the present invention. The color monitor receives, through its video interface and synchronization and on-board test circuits 10 and 12, respectively, a 36 MHz clock signal, composite sync signal and a three digital bit color signal, and thus is capable of reproducing eight different colors. A horizontal drive and clock signal is provided to the digital convergence generator 14 and also to the horizontal deflection and dynamic focus circuit 16.

The general functioning of the remaining circuitry shown in FIG. 1 is believed to be known. However, the digital convergence generator circuitry 14 is the subject of a co-pending U.S. patent application Ser. No. 722,935, filed concurrently herewith and commonly assigned to the assignee of this application. The disclosure of that patent application is hereby incorporated as if set forth in full herein.

Figure 2:
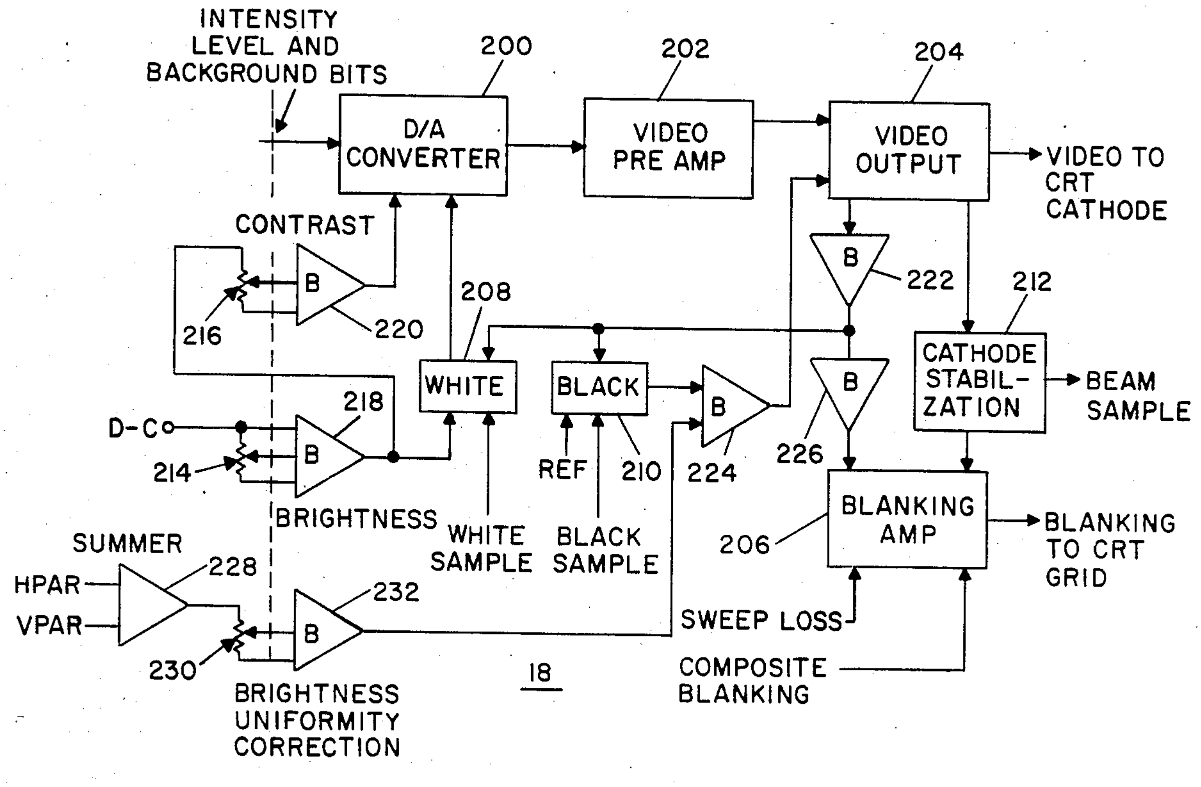
FIG. 2 is a block diagram of the video amplifier circuitry of the present invention.

FIG. 2 shows the circuitry of the video amplifier and processor 18 of the color monitor shown in FIG. 1. However, it should be understood that three such video amplifiers and processors, one for each of the three colors, red, green and blue, are used in the color monitor shown in FIG. 1.

The video processor circuit 18 receives three color intensity bits (only two in the case of the blue video processor) and one background bit from the video synchronizer 12. The received video bit information is applied to the input of the digital-to-analog converter 200, where the bits are converted to analog video signals. Adjustments are provided to control the D/A output for each input bit, thereby controlling the CRT output intensity for a given bit input. The analog video signals are preamplified in video preamp 202 and fed to the cathode 520 of the CRT 22 via the video output circuit 204. The video preamp 202 and video output circuit 204 function as a high gain/bandwidth amplifier to provide the necessary CRT drive signals.

The video processor and amplifier 18 also generates the video blanking driver signals that are output to the blanking grid 522 of the CRT 22 by blanking amplifier 206. In addition, white and black level sample circuits 208 and 210 and a beam sample or cathode stabilization circuit 212 are utilized. Those circuits are shown in FIGS. 3–6 and are described hereinafter.

In order to control the brightness and contrast of the CRT 22, the video amplifier 18 receives voltage reference information from the display control panel 24. The desired contrast and brightness settings are determined by the position of potentiometers 214 and 216, which are contained in the control panel 24. The voltage output from the brightness potentiometer 214 is buffered by buffer 218 and fed to the white level control circuit 208 which then sends it to the D/A converter 200 where it is used to adjust the amplitude of the analog voltage derived from the binary input color bits. It is also added to the signal from the contrast control 216 in the brightness buffer 220. It is then sent to the D/A converter 200, where it is used to control the D/A converter when a background bit is present.

The video processor 18 also receives a horizontal parabola signal from the horizontal deflection circuit 16 and a vertical parabola signal from the digital convergence circuit 14. Those two signals are summed in summer 228. The amplitude of the summed parabola signal is controlled by a potentiometer 230, connected to the output of the summer 228. The output of the potentiometer 230 is buffered by buffer 232 and then fed to buffer 224 where it is added to the output from the black level sample circuit 210. The resultant signal modifies the color analog output signal at the video output circuit 204 to control CRT brightness uniformity.

The brightness control 214 is utilized to establish a voltage reference against which the output of the video amplifier 18 is measured when a white sample is present as an input to the D/A converter 200. In the event an error is measured between the brightness reference and the white sample video output pulse, the gain of the D/A converter 200 is adjusted by control loop circuitry 208, to be described hereinafter in connection with FIG. 3, in order to establish a fixed white sample video output for a given brightness setting.

Figure 4:
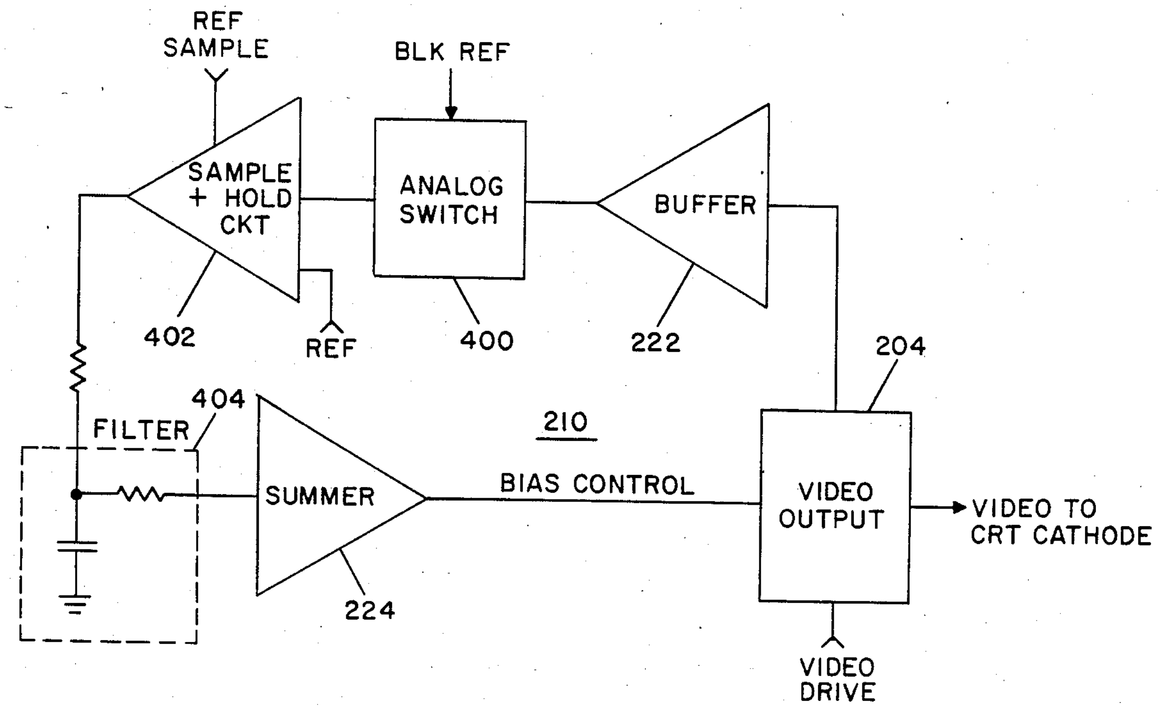
FIG. 4 is a schematic block diagram of the black level control circuitry contained in the video amplifier circuitry of FIG. 2.

In order to likewise maintain a fixed black video level output from the video amplifier 18, a second control loop circuit 210, to be described hereinafter in connection with FIG. 4, is provided. That is accomplished by measuring the video output from video output circuit 204 at a time when no video is present. For that purpose, the video output from the video output circuit 204 is fed, via a buffer 222, as an input to the black sample feedback loop circuit 210, where it is compared against the reference.

In the event any error is measured between the black reference and the black level of the video output stage, it is fed through a buffer 224 to an input of the video output circuit 204, and thus, the control loop circuitry 210 adjusts the 67 volt black video level output to the desired voltage level. The timing for the black level control loop 210 is established by the black level sample signals received from the synchronizer 12. Both the black level and white level samples are made during the horizontal blanking periods.

Figure 5:
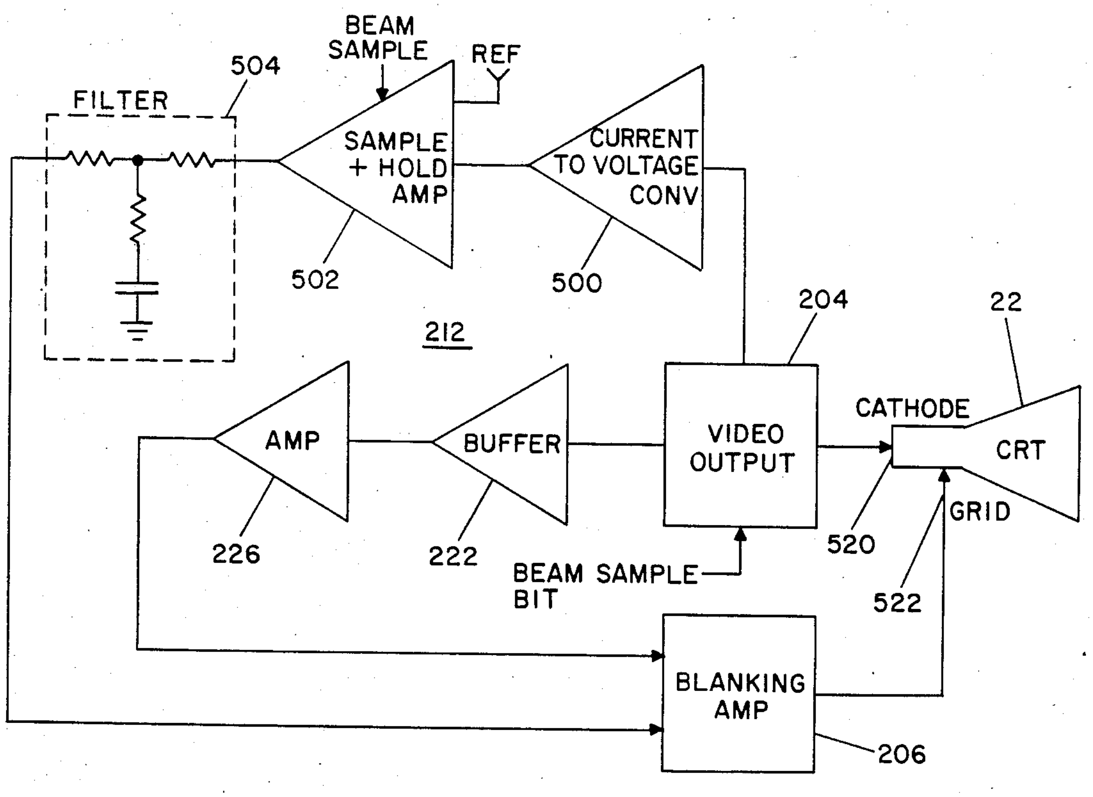
FIG. 5 is a schematic block diagram of the cathode stabilization circuitry contained in the video amplifier circuitry of FIG. 2.
Figure 6:
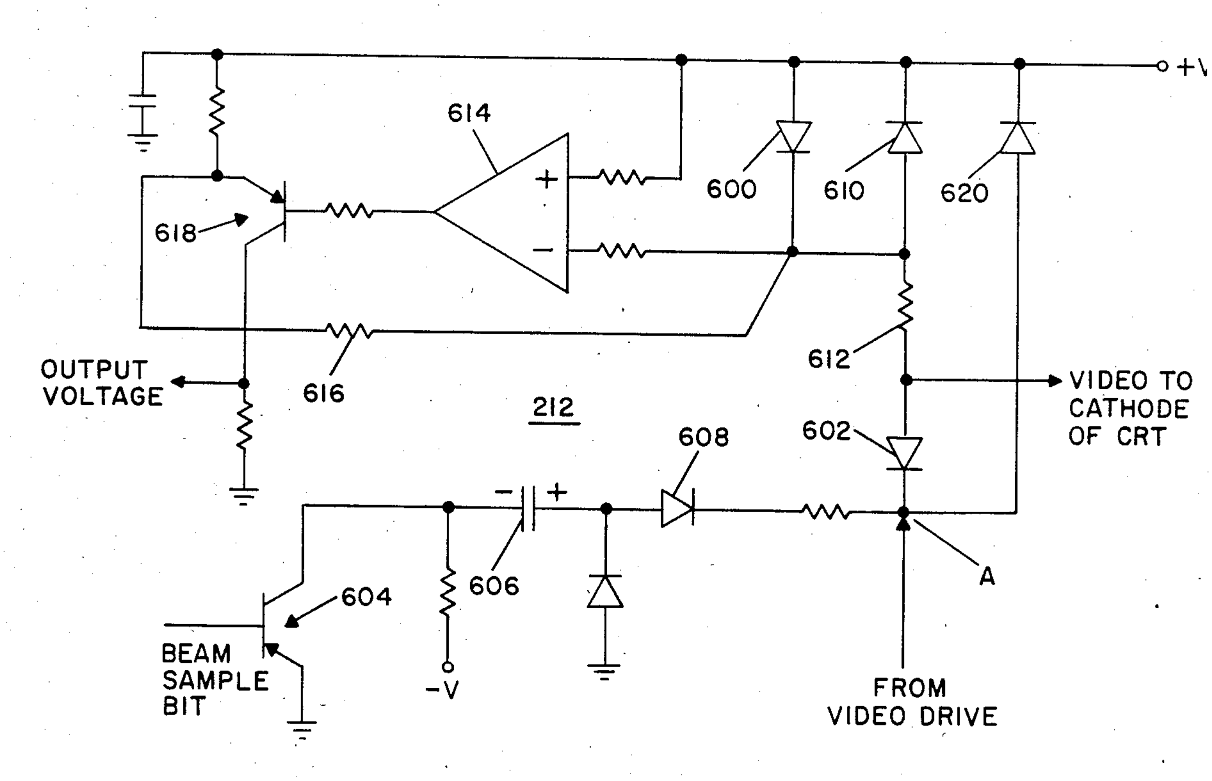
FIG. 6 is an electrical schematic diagram of the circuitry of the cathode stabilization circuitry of FIG. 5.

A third feedback control loop 212 is used by the video processor circuitry 18. That control loop circuitry 212, described in connection with FIGS. 5 and 6, is used to adjust the CRT grid 522 blanking voltage level in order to control beam current. That is accomplished by measuring or sampling the cathode current of the CRT 22 during the vertical retrace time. The current measured is compared within the cathode stabilization circuitry feedback control loop 212 with a reference value. The difference or error is determined and is then inputted to the blanking amplifier 206, where it is amplified and used to set the blanking or grid 522 voltage level. A blanking voltage level adjustment will set the cathode or beam current to the desired level.

Cathode beam sample current measurements are made utilizing beam sample signals received from the synchronizer 12. Individual cathode beam sample 212, white sample 208 and black sample 210 control loops or circuits are provided for each of the three CRT guns, red, green and blue. Such a system of cathode beam stabilization, coupled with the black and white level control loops, assures an accurate color display on the CRT 22. Thus, the brightness of each primary color in the data color mix is maintained within 10% of its desired value.

Since the three feedback loops 208, 210 and 212 in each of the three primary color channels include both the final video amplifier 18 and the CRT 22, equalization or color tracking and stabilization of their combined signal-to-brightness transfer characteristics against CRT and circuit drift is achieved. In addition, the color is independent of operator brightness and contrast controls. That is obtained by the color tracking and non-additive mixing of raster background color and data colors.

Figure 3:
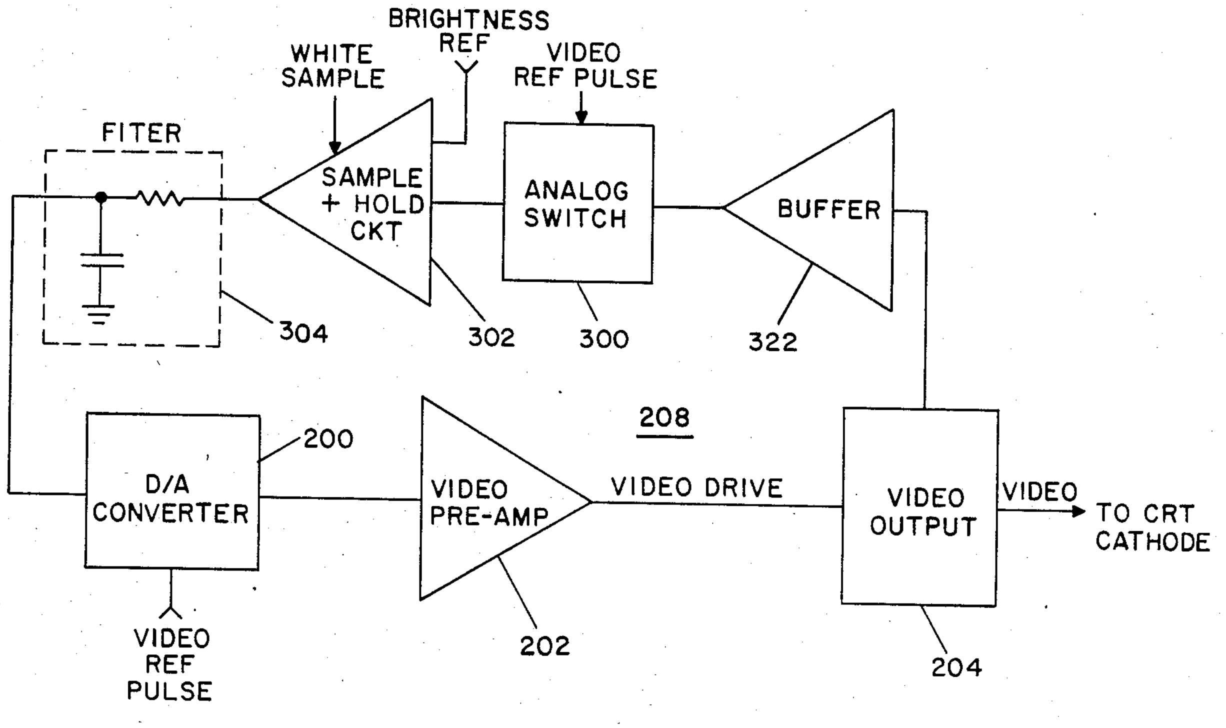
FIG. 3 is a schematic block diagram of the white level control circuitry contained in the video amplifier circuitry of FIG. 2.

Referring now to FIG. 3, there is shown the white level sample control loop 208 of the color monitor of the present invention. As previously described, the video output is fed from the video output circuit 204 to the input of a buffer 322. The thus buffered video output signal is inputted to an analog switch 300, as is a video reference pulse. The video refernce pulse applied to the analog switch 300 gates the buffered video output signal from the buffere 222 to one input of the sample and hold circuit 302. A brightness reference signal is fed to the other input. The sample-and-hold circuit 302 then compares the brightness reference signal to the buffered video output signal during the white sample signal time. The white sample and reference bits are received from the synchronizer 12, where they are developed using ROMs from the signals fed into the synchronizer circuit 12.

The white sample reference bit initiates a sample-and-hold measurement derived from the setting of the brightness potentiometer 214. The sample-and-hold circuit 302 measurement establishes the brightness or amplitudes of the video signal for a particular setting of the brightness control 214. The thus established brightness signal is then fed to the D/A converter 200, as described hereinabove.

FIG. 4 illustrates the black level sample feedback control loop circuit 210. The video output circuit 204 and buffer 222 are the same elements used by the white control circuit 208. A second analog switch 400 receives the output from the buffer 222, and during the black reference signal time, the output from the analog switch is fed to one input of a sample-and-hold circuit 402. A reference signal is applied to the other input of the sample-and-hold circuit 402. Those black reference and sample bits are also supplied from the synchronizer. circuit 12, in a manner similar to that described above in connection with the white sample and reference bits.

The black reference bit applied to the analog switch 400 gates the established black level voltage setting from the buffer 222 to the sample-and-hold circuit 402. The black sample bit applied to the sample-and-hold circuit 402 initiates a sample-and-hold measurement in order to maintain the established black level voltage. The black level voltage signal output from the sample-and-hold circuit 402 is filtered by filter 404 and then inputted to summer 224, which receives as an additional input the output from brightness uniformity correction buffer 232. A bias control signal is developed at the output of summer 224 and is fed to the video output circuit 204 and thence to the cathode 520 of the CRT 22.

FIG. 5 illustrates the cathode or beam stabilization loop control circuit 212 of the color monitor of the present invention. The CRT beam current signal is output from the video output circuit 204 to a current-to-voltage converter 500. The voltage representing the CRT beam current signal is fed to one input of a sample-and-hold circuit 502 and a reference is fed to the other input. Two beam sample bits are inputted to the control loop 212, one to gate the sample-and-hold circuit 502 and the other to gate the video output stage to accept CRT beam current. The output of the sample-and-hold circuit 502 is filtered by filter 504 and then fed to the blanking amplifier 206, where it is used to set the blanking bias level, based upon the fixed CRT cathode sample current.

In addition, buffers 222 and 226 assure that the shift in the cathode voltage during the beam sample interval is sent to the blanking amplifier 206 to assure that constant levels are applied to the CRT 22, both to the grid 522 and the cathode 520, during the beam sample interval.

In the above-recited manner, the black level voltage and blanking bias levels ensure a CRT output that is a fixed function of the CRT video input. The blanking signals are applied to the the associated color control grids 522 of the CRT 22.

FIG. 6 illustrates one way in which the cathode stabilization circuit 212 of FIG. 5 may be realized. The circuit of FIG. 6 provides for both beam sampling and CRT cathode video drive. Driving the cathode instead of the grid with the video signal has the advantage of providing a lower capacitive load on the cathode circuit, thus resulting in a greater bandwidth response.

Under normal conditions of video drive, diodes 600 and 602 conduct and provide a current path to the video drive circuitry of the CRT 22.

During the beam sample interval, a first transistor 604 is turned on, grounding the negative side of the capacitor 606. The positive side of capacitor 606 turns on the diode 608 that supplies the current required by the video driver circuitry, plus additional current through diode 620, thereby clamping point A to the +V power source. Under such conditions, diode 602 becomes reverse-biased and diodes 600 and 610 have zero volts across them. At that time, the current flowing into the cathode, the CRT beam current, flows through the resistor 612 and is then amplified by the operational amplifier 614, the resistor 616 and the second transistor 618. The second transistor 618 provides the level shift to reference output voltage to ground. That output voltage is proportional to the cathode current.

There has thus been described a color television monitor in which a video processing circuit is used in order to generate a highly accurate and precise color display. Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A color video monitor having a video siganl path for providing an input video signal and for displaying the video signal on a high resolution CRT display, comprising:

means for processing an input video signal, said means for processing associated with the video signal path such that the video signal is not affected by said means for processing;

means for producing color convergence signals;

first means, connected to receive said color convergence signals, for providing vertical deflection signals and convergence driver signals for said color video monitor;

second means, connected to the first means, for providing horizontal deflection signals and dynamic focus signals for said color video monitor; and third means, coupled to said cathode ray tube, for receiving said color convergence, vertical and horizontal deflection signals and for controlling the display on said cathode ray tube;

wherein said means for processing an input video signal comprises: (1) digital-to-analog means for converting a three bit digital color code input to a signal representative of a desired amplitude component for a primary color and (2) a plurality of separate feedback loops, one loop for each of the primary colors, said feedback loops for maintaining the brightness of each of the primary colors to within 10% of the desired amplitude component.

2. The color video monitor of claim 1 wherein each said feedback loop comprises:

means for gating a video output current in the video signal path during a predefined beam sampling interval;

means for converting the gated video output current into a corresponding video output voltage;

means for comparing the video output voltage to a reference voltge and generating a difference voltage corresponding to the compared voltages; and means for setting a blanking bias level within the video signal path in response to the difference voltage.

3. The color video monitor of claim 2 wherein each of said feedback loops comprises both said CRT and a video amplifier such that equalization and stabilization of their combined signal-to-brightness transfer characteristics against CRT and video color monitor circuit drift is minimized.

4. The color video monitor of claim 2 wherein said means for processing an input video signal comprises:

white sample level circuit means, connected to rceive an operator set brightness signal, to provide a white sample output signal to said D/A converter, for setting the amplitude of the input video signal;

black sample level circuit means, connected to receive the output from siad D/A converter, to provide a black sample output signal to the cathode of said CRT, for maintaining a desired black level voltage of said CRT; and cathode stabization circuit means, connected to receive a sample of the CRT cathode current to provide a cathode stabilization signal for setting a blanking bias of said CRT.

5. A video processing system for a color monitor having a video signal path for providing an input video signal and for displaying the a video signal on a high resolution CRT, comrpising:

means for producing a signal representative of a desired amplitude component for a primary color displayed on the CRT, said means for producing associated with the video such that said video path is not affected by said means for producing, said means for producing including a feedback loop including:

white sample level circuit means, connected to receive and responsive to an operator set brightness signal, said white means for providing a white sample output signal to said means for producing a signal for setting the amplitude of an input video signal;

black sample level circuit means, connected to receive and responsive to the output from said means for producing a signal, said black means for generating a black sample output signal for the cathode fo said CRT for maintaining a desired black level voltage of said CRT; and cathode stabilization circuit means, connecting to receive and responsive to a sample of the CRT cathode current, said cathode means for providing a cathode stabilization signal for setting the blanking bias of said CRT.

6. The video processing system of claim 5 wherein means for producing comprises:

means for gating a video output current in the video signal path during a predefined beam sampling interval;

means for converting the gated video output current into a corresponding video output voltage;

means for comparing the video output voltage to a reference voltge and generating a difference voltage corresponding to the compared voltages; and means for setting a blanking bias level within the video signal path in response to the difference voltage.

7. The video processing system of claim 6, wherein said means for producing a representative signal is a digital-to-analog converter.

8. The video processing system of claim 7, further including amplifying means for receiving the representative signal and applying it to the cathode of said CRT.

9. The video processing system of claim 7, wherein said digital-to-analog converter converts a three bit digital color code input to a signal representative of a desired amplitude component for a primary color of said CRT.

10. The color video monitor of claim 6, wherein a plurality of said means for processing an input video signal is utilized.

11. The color video monitor of claim 10, wherein each of said plurality of said means for processing an input signal independently processes a different primary color of said CRT.

12. The video processing system of claim 6, wherein said means for producing, said white sample level circuit means, said black sample level circuit means and said cathode stabilization circuit means form a one-color video processing subsystem and wherein a plurality of said video processing subsystems is utilized, one for each of the primary colors of said CRT.

13. The video processing system of claim 6, wherein said white sample level circuit means comprises means for amplifying the representative signal of the CRT.

14. The video processing system of claim 13, wherein said white sample level circuit means further comprises:

switch means for receiving a video reference pulse and a video output signal;

sample and hold means for comparing a combined brightness reference signal and the output from said switch means with a predetermined white sample signal; and filter means for filtering the output from said sample and hold means;

such that the brightness of the video output signal is adjusted.

15. The video processing system of claim 6, wherein said black level sample circuit means comprises means for amplifying the representative signal of the CRT.

16. The video processing system of claim 15, wherein said black sample level circuit means further comprises:

switch means for receiving a black reference eignal and a video output signal;

sample-and-hold means for comparing the output from said switch means to a predetermined first reference signal during a reference sample interval; and filter means for filtering a black level voltage signal output from said sample and hold means;

such that the black level voltage of the CRT is adjusted.

17. The video processing system of claim 16, wherein said sample level cirucit means further comprises summing means for adding said black level voltage signal to a brightness uniformity correction signal and for applying the summed signal to the cathode of said CRT in order to control the bias of said cathode.

18. The video processing system of claim 6, wherein said cathode stabilization circuit means comrpises:

means for converting a CRT beam sample signal to a representative voltage signal;

sample-and-hold means for comparing said representative voltage signal and a reference signal to produce a blanking control signal; and filter means for filtering said blanking control signal prior to its application to the grid of the CRT.

19. The video processing system of claim 18, wherein said cathode stabilization circuit means further comprises means for amplifying said blanking control signal.

* * * * *